F. B. SPOONER.

CLASP.

No. 10,995. Reissued Apr. 16, 1889.

Witnesses

E. A. Bond.

T. J. W. Robertson

Inventor

Frederick B. Spooner.

By his Attorney

Chas. S. Hyer.

N. PETERS, Photo-Lithographer, Washington, D. C.

UNITED STATES PATENT OFFICE.

FREDERICK B. SPOONER, OF BROOKLYN, NEW YORK.

CLASP.

SPECIFICATION forming part of Reissued Letters Patent No. 10,995, dated April 16, 1889.

Original No. 397,034, dated January 29, 1889. Application for reissue filed March 6, 1889. Serial No. 302,181.

*To all whom it may concern:*

Be it known that I, FREDERICK B. SPOONER, a citizen of the United States, residing at Brooklyn, in the county of Kings and State of New York, have invented certain new and useful Improvements in Clasps; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in clasps to be used in connection with corsets, gloves, and belts, and other articles; and it consists in the novel construction and arrangement of the parts thereof, as will be more fully hereinafter described and claimed.

The essential feature of the invention is the use of an automatically-operating latch mounted in a novel form of plate adapted to be attached to the article with which the clasp is used.

The object of my invention is to provide a clasp which will not become readily disengaged by the movements of the wearer, but quickly engaged and opened when desired, the parts thereof being simple and effective in their construction and operation. I attain this object by the construction illustrated in the accompanying drawings, wherein like letters of reference indicate similar parts in the several views, and in which—

Figure 1:
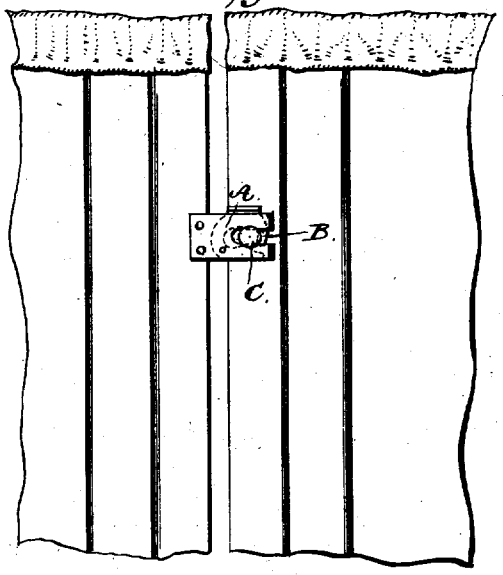
Figure 4:
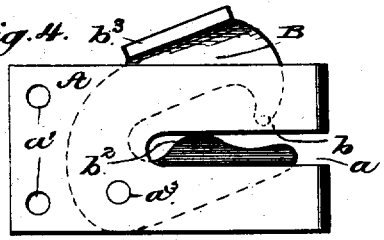
Figure 5:
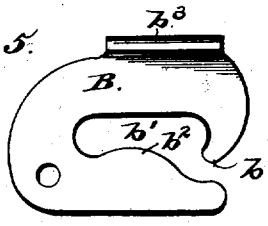
Figure 2:
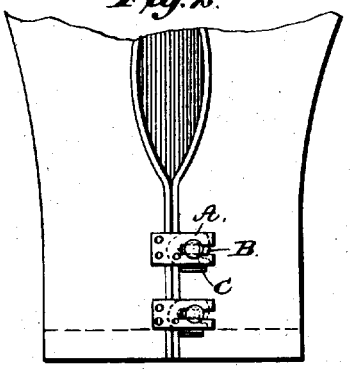
Figure 6:
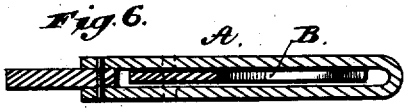
Figure 3:
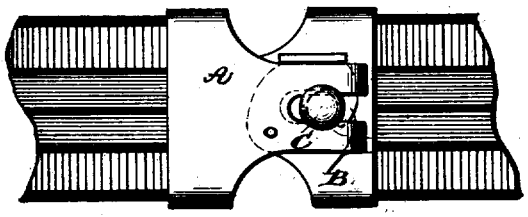
Figure 7:
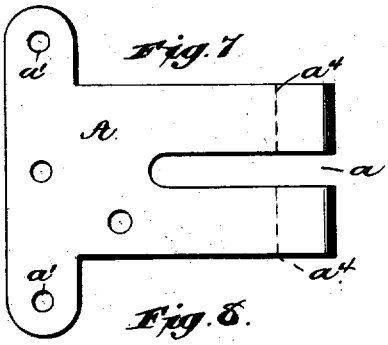
Figure 8:
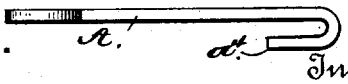

Figures 1, 2, and 3 represent, respectively, a part of a corset, glove, and belt with my improved clasp applied in connection therewith. Fig. 4 is a top plan view of the clasp detached, showing the latch raised. Fig. 5 is a detail view of the latch. Fig. 6 is a longitudinal vertical section of the plate and latch. Fig. 7 represents a modified form of the plate. Fig. 8 is an edge elevation of the plate shown in Fig. 7.

A indicates the latch-supporting plate, which, as shown in Figs. 1, 2, 3, 4, and 6, is formed of a sheet of metal doubled over on itself and having a cut or channel, $a$, opening thereinto from one end for the reception of the eye or shank of a stud on the steel opposite in the act of closing. The other end of said plate A is formed with rivet-holes $a'$, for the purpose of attachment. As shown in Figs. 7 and 8, this plate A is formed of a single piece of sheet metal with bent-over or looped ends $a^4$. The slot or channel $a$ is in a position in this instance similar to that in the form of plate heretofore described. The rivet-holes $a'$ in the latter plate are formed in ears projecting out laterally from the end of the plate opposite to that in which the slot or channel is formed. I reserve the right to use known equivalents of the rivets and rivet-holes for attachment.

To plate A a latch, B, is hinged or pivoted by a rivet, $a^3$, passing therethrough and through said plate, below the slot or channel $a$ in said plate. The front edge of the latch B is formed with a hook, $b$, which partially overhangs a cam-slot, $b'$, entering from the adjacent side of the latch. The front edge of the hook $b$ is curved rearward to provide a camway for the stud eye or shank to operate against in raising the latch. The cam-slot is irregular in contour from the rear of the hook $b$ to a point where an enlargement or swell, $b^2$, is formed, and from thence extends downward, the space between the point of the hook and the lower terminating point of the slot being sufficiently large to allow ready entrance of the eye or shank of the stud. The upper edge of the latch is formed with a struck-up part, $b^3$, which provides a guard to prevent the latch from falling through or under the plate A, and also serves as a means for raising the latch. As shown in Fig. 2, the lower edge of the latch may be formed with a similar guard, to enable the latch to be operated from the lower edge, if desired.

The latch B is inserted between the parts of plate A shown in Figs. 4 and 6, and bears against the under side of the form of plate shown in Figs. 7 and 8.

In the use of either form of plate the hook of the latch is shielded against contact or engagement with apparel by the bent end thereof.

When the double plate is used, it embraces the steel, while the single plate bears on the upper surface thereof. The advantage gained in the use of the single plate is a saving of metal, and consequently a reduction of expense in manufacture.

In operation, if the latch B is down, the eye or shank of a stud, C, strikes against the front curved edge of hook $b$ of the latch and raises the latter. The said eye or shank then enters the slot $a$ of plate A until it strikes the enlargement $b^2$ of the cam-slot $b'$ of the said latch, and in riding over said enlargement it forces the hook $b$ down over the said eye or shank and secures the same in connection with the clasp. If the hook $b$ be raised, as shown in Fig. 4, the eye or shank of the stud enters slot $a$ of plate A and strikes the enlargement $b^2$, when the operation will be the same. When it is desired to release the eye or shank from the clasp, the latch is raised by means of the guard $b^3$, when the said eye or shank will be permitted to pass out through the slot $a$ in plate A. Thus it will be seen that the wearer only presses the stud into the slot or channel in the plate on the opposite side of the corset or other article, and the latch opens and closes automatically.

The clasp herein set forth has great strength and durability, and is adapted to be readily attached to any class of articles where applicable.

I do not confine myself to the exact forms of construction and arrangement herein set forth, as the same may be varied without in the least departing from the nature or spirit of my invention.

I do not limit myself to a stud to be used in connection with my clasp, but reserve the right to use any known equivalent, and, further, I do not confine myself to the exact mode of attachment of the slotted supporting-plate to a corset-steel or other article, as shown, but also reserve the right in this instance to apply the said plate in such manner as not to interfere with the practical operation of the locking-latch.

Having thus described my invention, what I claim is—

1. A clasp for garments, substantially as set forth, comprising two parts consisting of a slotted plate and a cam-slotted latch pivoted to said plate and adapted to be operated by the stud eye or shank which it secures.

2. A clasp adapted to be operated by a stud, substantially as set forth, comprising a stationary slotted plate with an unattached bent-over end and a cam-slotted latch pivoted thereto, and whose bent-over end incloses the front part of said latch.

3. A clasp adapted to be operated by and secure a stud eye or shank, substantially as set forth, consisting of a plate constructed of a piece of doubled sheet metal having a slot therein for the reception of the stud eye or shank, and a cam-slotted latch pivoted to said plate and inclosed thereby.

4. A clasp adapted to be operated by and secure a stud eye or shank, comprising a doubled sheet-metal plate having a slot therein and a latch pivoted thereto having an operating-guard, a hooked end, and a slot with a cam projection.

5. A clasp substantially as described, comprising a slotted plate and a latch pivoted thereto having an open slot with a cam projection, in combination with an adjacently-situated stud for operating and engaging said latch.

6. A clasp adapted to be operated by a stud, substantially as set forth, comprising a slotted plate with a bent-over unattached end, and a cam-slotted latch pivoted thereto having an overhanging hooked end provided with a front-curved edge.

7. A clasp comprising a slotted plate, a latch having an open slot, with a cam projection pivoted to said plate below the slot thereof, and an adjacently-situated stud or its equivalent adapted to engage the slots in said plate and latch and close said latch independent of spring action, substantially as described.

8. A corset-fastening having studs or equivalents on one steel thereof and slotted plates secured to the opposite steel in alignment with the said studs, each plate having a cam-slotted latch pivoted thereto and operating through said slotted plate, adapted to be actuated by and secure said studs, substantially as described.

9. A clasp comprising a doubled sheet-metal plate provided with a slot in its doubled portion for the entrance of a stud or analogous device, and a locking-latch mounted in said plate and inclosed thereby, substantially as described.

In testimony whereof I affix my signature in presence of two witnesses.

FREDERICK B. SPOONER.

Witnesses:

WILLIAM V. A. POE,
GEORGE W. FRENCH.